No. 766,874. PATENTED AUG. 9, 1904.
F. E. CHEESMAN.
AIR CHECK EXPOSING DEVICE FOR CAMERAS.
APPLICATION FILED SEPT. 4, 1903.
NO MODEL.
Fig. 1.
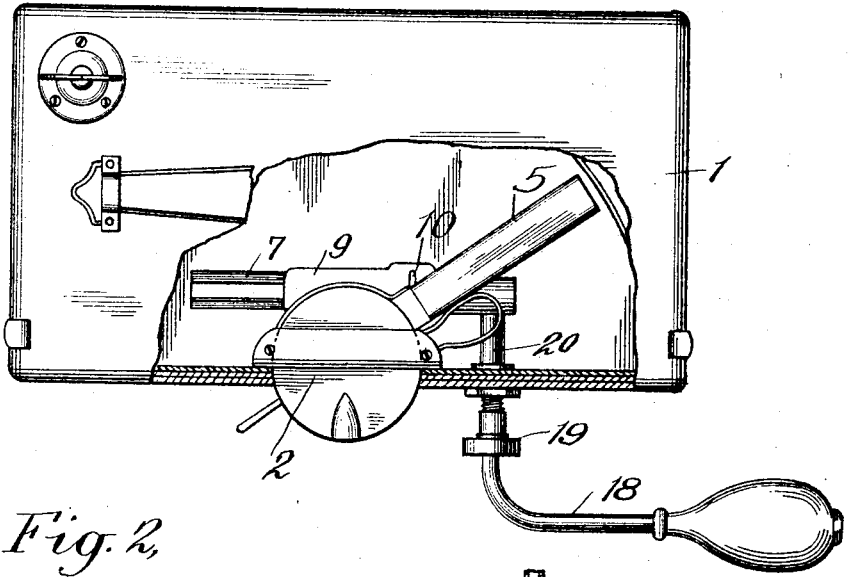
Fig. 2.
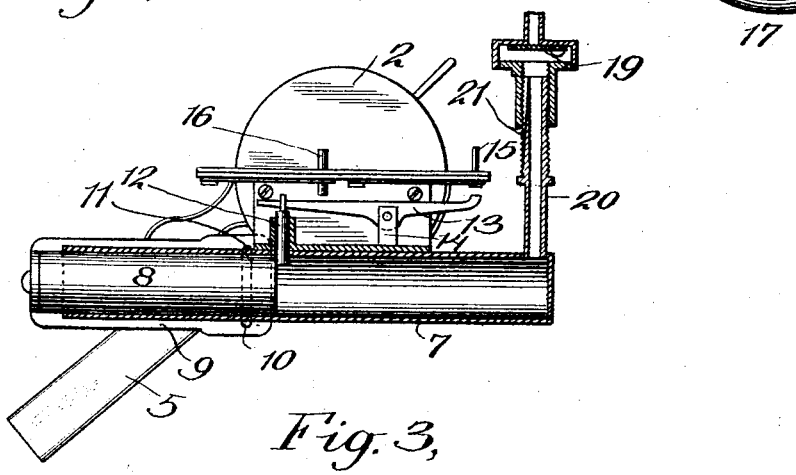
Fig. 3.
WITNESSES
Harry Goss
C. F. Carrington
INVENTOR
Frederic E. Cheesman
BY
Chapin Raymond & Mark
his ATTORNEYS No. 766,874.

Patented August 9, 1904.

UNITED STATES PATENT OFFICE.

FREDERIC E. CHEESMAN, OF NEW YORK, N. Y.

AIR-CHECK EXPOSING DEVICE FOR CAMERAS.

SPECIFICATION forming part of Letters Patent No. 766,874, dated August 9, 1904.

Application filed September 4, 1903. Serial No. 171,871. (No model.)

*To all whom it may concern:*

Be it known that I, FREDERIC E. CHEESMAN, a citizen of the United States of America, and a resident of New York city, borough of Brooklyn, county of Kings, and State of New York, have invented certain new and useful Improvements in Air-Check Exposing Devices for Cameras, of which the following is a specification, reference being had to the accompanying drawings, forming a part thereof.

My invention relates to improvements in cameras, and particularly to improvements in exposing devices therefor.

My invention consists in the combination, with a movable exposing member and means for actuating same, of a pneumatic checking device for opposing movement of the exposing member, provided with means whereby compressed air may be introduced therein in advance of the movement of the exposing member.

The main object of my invention is to obtain a uniform movement of the exposing member.

In the embodiment of my invention herein shown and described I have applied my improved exposing device to a panoramic camera in which the swinging lens-carrier constitutes the movable exposing member.

In the operation of my device a substantially uniform movement is accorded to the swinging lens-carrier, and thereby uniform exposure through the entire arc of movement thereof is obtained.

My invention further consists in an improved detent and tripping means for releasing the movable exposing member and in means whereby compressed air introduced to retard movement of the exposing member will simultaneously operate the detent.

My invention further consists in certain novel details of construction and combination of parts as herein shown and presently to be described, and other advantages of my invention will appear hereinafter.

I will now proceed to describe a camera and exposing device embodying my invention and will then point out the novel features in claims.

In the drawings, Figure 1 is a top view, partly broken away, of a camera having an exposing device in connection therewith embodying my invention. Fig. 2 is an inverted view of the movable exposing member thereof and a central horizontal section through the retarding-cylinder and certain connected parts. Fig. 3 is a view in vertical section of the parts shown in Fig. 2, the plane of section being taken through the lens-carrier and its mounting.

The camera herein comprises a box or casing 1, to which is secured the lens-carrier mounting 2, arranged to support a movable exposing member or swinging lens-carrier 3. The lens-carrier 3 comprises a cylindrical portion 4, which supports the lens, and a rearwardly-projecting light tube or funnel 5. A spring 6 is located between the top of the cylindrical portion of the lens-carrier and the upper end of the mounting 2 and constitutes a means for actuating the movable exposing member or lens-carrier. One end of the said spring is supported to a stationary portion, as the lens-carrier mounting, and the other end is secured to the movable lens-carrier.

A retarding-cylinder 7 is secured to a fixed portion of the device, as to the lower end of the lens-carrier mounting, and the said cylinder is provided with a piston 8, suitably mounted therein, which piston is provided with a plate 9, secured to the outer end thereof and extending parallel with it and with the outer wall of the cylinder 7. The wall of the cylinder 7 is slotted for a certain distance opposite the plate 9, so as to receive and permit passage therethrough of that portion of the plate 9 immediately adjacent to the piston 8. The plate 9 is provided near its inner end with a transverse slot 10, adapted to receive the lower end of a pin 11, extending downwardly from the inner end of the light tube or funnel of the lens-carrier. Reciprocating movement of the piston 8 within the cylinder 7 will by this means always take place simultaneously with the swinging movement of the exposing member or lens-carrier. A detent 12 is mounted in a lateral extension on the side of the cylinder 7 and is arranged to enter the cylinder 7 in the path of movement of the piston 8. When the piston 8 is moved to the left (see Fig. 2 of the drawings) to the full extent of movement permitted, the detent 12 will be permitted to enter the cylinder in the path of movement of the piston, and return movement of the piston will be prevented. When the piston is in such position, the lens-carrier will have been moved to the limit of its movement in one direction against the resistance of the actuating means or spring 6 and will thus be held by the detent 12 in such position until it is released by movement of the detent 12, when the spring or actuating means will be permitted to operate and return the parts to their normal positions upon the opposite side of the center of rotation of the exposing member and in which position the said parts are shown in Fig. 1 of the drawings. The detent 12 is engaged at its outer end by a tripping-lever 13, suitably pivoted at 14 to a stationary portion of the device, and spring finger-pieces 15 and 16 are arranged opposite portions of the lever 13 upon opposite sides of the center thereof. By depressing finger-piece 15 the lever 13 may be rocked upon its pivotal support 14 and the detent 12 withdrawn from the front of the piston 8 to permit the parts to operate. Upon the return of the piston 8 to the position shown in Figs. 2 and 3 of the drawings the detent 12 may be returned to its position, the front of the piston, by depression of the finger-piece 16. The detent 12 is also adapted to be operated pneumatically, and pneumatic means are provided in connection with the cylinder 7 for so operating it. The pneumatic means comprise a pressure-bulb 17, a flexible connection 18, a check-valve 19, and a tube 20, connecting with the rear end of the cylinder 7. Air under pressure may be supplied to the cylinder 7 by pressure upon the bulb 17, and the compressed air acting upon the inner end of the detent 12 will force the same outwardly to release the swinging lens-carrier or movable exposing member and to permit the parts to move under actuation of the spring 6. The cylinder 7 will also act as a retarding-cylinder, because the compressed air introduced into the cylinder will act as a pneumatic checking device against the forward movement of the piston 8. The check-valve 19 will prevent return of the compressed air into the bulb 17 after the same has been compressed and again released, and in order to permit a gradual escape of compressed air from the cylinder 7 an exhaust-port 21 has been provided, in this instance formed by a tapered groove in the side of the tube 20 and which is partially covered by the casing of the check-valve 19. The casing of the check-valve 19 has a screw-threaded connection with the tube 20, and by screwing the casing up or unscrewing same the exhaust area of the port 21 may be adjusted and the speed at which the movable exposing member or swinging lens-carrier is permitted to move thus determined and controlled. The introduction of initially-compressed air into the cylinder 7 in advance of or prior to the first movement of the piston 8 will cause a substantially uniform movement of the same to be maintained, and by causing the detent 12 to be operated by the same force of compressed air I so arrange that the parts shall not be released until a sufficient quantity of compressed air has been introduced into the cylinder 7 to properly oppose the movement of the parts. In resetting the parts, which will ordinarily be done by hand, the return of the piston 8 will tend to slightly rarefy the air in the cylinder 7, because air will be permitted to come in but slowly through the restricted exhaust-port 21, and when the piston has reached the limit of its movement the detent 12 will be drawn by the slight suction into its position in the path of movement of the piston to lock same against return movement.

It is obvious that the foregoing is but one embodiment of my invention and that the construction and arrangement of parts therein may be modified within wide limits without departing from the spirit and scope thereof and, further, that certain parts may be used separately or in combination with parts of other construction. Hence I do not desire to be limited only to the precise details of construction and combination of parts herein shown and described.

What I claim is—

1. In an exposing device for cameras, the combination with a movable exposing member and means for actuating same, of a pneumatic checking device for said exposing member and means for introducing air under pressure thereto to oppose the movement of the exposing member.

2. In an exposing device for cameras, the combination with a movable exposing member and means for actuating same, of a pneumatic checking device for said exposing member and means for compressing air therein in advance of the movement of the exposing member.

3. In an exposing device for cameras, the combination with a movable exposing member and means for actuating same, of a retarding-cylinder for said movable exposing member, and means for introducing compressed air therein.

4. In an exposing device for cameras, the combination with a movable exposing member and means for actuating same, of a retarding-cylinder for said movable exposing member, and means for compressing air therein other than that compressed by the movement of the exposing member.

5. In an exposing device for cameras, the combination with a movable exposing member and means for actuating same, of a cylinder, a piston therein connected to move with the exposing member, and means for introducing air under pressure in the cylinder to oppose the movement of the exposing member.

6. In an exposing device for cameras, the combination with a movable exposing member and means for actuating same, of a retarding-cylinder for said actuating member, said retarding-cylinder having a discharge-port, means for varying the discharge area of said port, and means for introducing air under pressure into the retarding-cylinder.

7. In an exposing device for cameras, the combination with a movable exposing member and means for actuating same, of a retarding-cylinder for said exposing member, a detent for releasing said exposing member, and means for introducing compressed air into said retarding-cylinder and simultaneously releasing said detent.

8. In an exposing device for cameras, the combination with a movable exposing member and means for actuating same, of a retarding-cylinder for said exposing member, a pneumatically-operated detent for releasing said exposing member, said pneumatically-operated detent connected with the interior of said retarding-cylinder, and means for introducing compressed air into said retarding-cylinder to operate said pneumatic trip and simultaneously to oppose the movement of the exposing member.

9. In an exposing device for cameras, the combination with a movable exposing member and means for actuating same, of a retarding-cylinder for said movable exposing member, means for introducing compressed air into said retarding-cylinder to oppose the movement of the exposing member, and a check-valve opposing the release of compressed air from the cylinder.

10. In an exposing device for cameras, the combination with a movable exposing member and means for actuating same, of a retarding-cylinder for said movable exposing member, having an adjustable exhaust-port, means for introducing compressed air into said retarding-cylinder to oppose the movement of the exposing member, a check-valve opposing the release of compressed air from the cylinder, and means for varying the discharge area of the exhaust-port.

11. In an exposing device for cameras, the combination with a movable exposing member and means for actuating same, of a retarding-cylinder for said exposing member, a pressure-bulb connected therewith, and a check-valve between the pressure-bulb and the cylinder.

12. In an exposing device for cameras, the combination with a movable exposing member and means for actuating same, of a retarding-cylinder for said exposing member having an adjustable exhaust-port, a pressure-bulb for said cylinder, a check-valve between the pressure-bulb and the retarding-cylinder, and means for varying the discharge area of the exhaust-port.

13. In an exposing device for cameras, the combination with a movable exposing member and means for actuating same, of a cylinder, a piston secured to move with said exposing member, a detent entering said cylinder in advance of the piston, and a pressure-bulb for introducing compressed air into the cylinder to cause movement of the detent and oppose movement of the piston.

14. The combination with the swinging lens-carrier of a panoramic camera, and means for actuating same, of a pneumatic checking device for the carrier, and means for introducing air under pressure thereto to oppose the movement of the said lens-carrier.

15. The combination with the swinging lens-carrier of a panoramic camera, and means for actuating same, of a retarding-cylinder for said movable exposing member, and means for introducing compressed air therein.

16. The combination with the swinging lens-carrier of a panoramic camera, and means for actuating same, of a cylinder, a piston therein connected to move with the swinging lens-carrier, and means for introducing air under pressure in the cylinder to oppose the movement of the said lens-carrier.

17. The combination with the swinging lens-carrier of a panoramic camera, and means for actuating same, of a retarding-cylinder, a detent for releasing said lens-carrier, and means for introducing compressed air into said retarding-cylinder and simultaneously releasing said detent.

18. The combination with the swinging lens-carrier of a panoramic camera, and means for actuating same, of a retarding-cylinder for said lens-carrier, a pneumatically-operated detent for releasing said lens-carrier, said pneumatically-operated detent connecting with the interior of said retarding-cylinder, and means for introducing compressed air into said retarding-cylinder to operate said pneumatic trip and simultaneously to oppose the movement of the said lens-carrier.

19. The combination with the swinging lens-carrier of a panoramic camera, and means for actuating same, of a retarding-cylinder for said lens-carrier, a pressure-bulb connected therewith, and a check-valve between the pressure-bulb and the cylinder.

FREDERIC E. CHEESMAN.

Witnesses:
C. F. CARRINGTON,
MINERVA POPE.